United States Patent [19]

Scorteanu et al.

[11] 4,257,669
[45] Mar. 24, 1981

[54] OPTICAL-ELECTRONIC SYSTEM FOR THE IDENTIFICATION OF A RETRO-REFLECTIVE LABEL

[75] Inventors: Ionel R. Scorteanu, Bucharest; Emil Spirea, Str. Palazu Mare; Radu Cristea, Bucharest, all of Romania

[73] Assignee: Institutul de Cergetari s Proiectari Technologice in Transporturi, Bucharest, Romania

[21] Appl. No.: 45,688

[22] Filed: Jun. 5, 1979

[30] Foreign Application Priority Data

Apr. 16, 1979 [RO] Romania ................... 97240

[51] Int. Cl.³ .............................................. G02B 27/17
[52] U.S. Cl. ........................................................ 350/6.8
[58] Field of Search ................ 358/295; 350/6.8, 6.5, 350/6.9, 6.7; 250/236; 235/467; 435/61 R

[56] References Cited

U.S. PATENT DOCUMENTS

| | | | |
|---|---|---|---|
| 2,779,819 | 1/1957 | Graham et al. | 350/6.8 |
| 2,844,648 | 7/1958 | Rosenthal | 350/6.8 |
| 3,225,177 | 12/1965 | Stites et al. | 235/61.11 |
| 3,456,997 | 7/1969 | Stites et al. | 350/6.8 |
| 3,571,571 | 12/1965 | Grot et al. | 235/468 |
| 3,612,644 | 10/1971 | Stites | 350/6.8 |
| 3,626,091 | 12/1971 | Casper | 350/6.8 |
| 3,646,568 | 2/1972 | Woywood | 350/6.8 |
| 3,818,444 | 6/1974 | Connell | 350/6.8 |
| 3,870,394 | 3/1975 | Ploeckl | 350/6.8 |
| 3,973,825 | 8/1976 | Starkweather | 350/6.8 |

*Primary Examiner*—John K. Corbin
*Assistant Examiner*—B. W. de los Reyes
*Attorney, Agent, or Firm*—Karl F. Ross

[57] ABSTRACT

The invention refers to an optical-electronic system for the automatic identification of a retroreflective label attached to a car, container, industrial product, etc., in motion or at rest.

To accomplish this end, two optical systems have been used, of which one emits light and the other receives light reflected by the label.

The axes of the two systems are parallel and the lenses are tangent to each other, so that the angle between the incident and reflected beams on the retroreflective label are as small as possible.

8 Claims, 2 Drawing Figures

OPTICAL-ELECTRONIC SYSTEM FOR THE IDENTIFICATION OF A RETRO-REFLECTIVE LABEL

FIELD OF THE INVENTION

Our present invention relates to an optical-electronic system for the automatic identification of a retroreflective label attached to a car, container, industrial product, etc., in motion or at rest.

BACKGROUND OF THE INVENTION

An optical-electronic system for automatic label identification is described in U.S. Pat. Nos. 3,225,177 and 3,612,644.

A label scanned by such a system comprises, as described in U.S. Pat. No. 3,571,571, an array of colored stripes arranged in a two-position base-four format for coding information pertaining to a vehicle to which the label is attached.

In order to eliminate unwanted reflections generated by protection material of the reflective label, the incident beam on the label should form an angle of 12°–15° with a normal plane to the reflective surface, as described in U.S. Pat. No. 3,456,997.

The 12°–15° inclination of the incident beam reduces the reflected light.

The energy loss is being justified by the elimination of unwanted reflections and by a better reading of the stripes placed in peripheral positions.

OBJECTS OF THE INVENTION

An object of our present invention is to provide an improved color-area scanning system of the above-mentioned type with increased energy efficiency with respect to light beams utilized in the scanning process.

Another object of our present invention is to provide such a system which reduces background noise.

SUMMARY OF THE INVENTION

According to our present invention, an optical-electronic system for the identification of a reflective label separates the light from a source from that reflected by the label. This separation is implemented by means of a first lens which projects the light received from the light source onto half of an active or effective mirror of a mirrored rotating wheel, which in turn reflects the light onto the label being scanned; light thereupon emitted by the label is received on the other half of the active mirror and is sent to a second lens placed in the vicinity of the first lens and parallel to it, so that the axes of these lenses are substantially parallel. The light signal received by the second lens is sent through a system consisting of a diaphragm and a lens upstream of a dichroic mirror which transmits red light to upstream of a photomultiplier and reflects the blue light towards another photomultiplier. The photomultipliers convert or transduce the light signals into electric signals fed to an electronic processing block for decoding into digits constituting the information coded on the reflective label.

According to another feature of our present invention, the angle between the incident beam and the beam reflected by the color-stripe label and received by the optical system is approximately 50', the distance between the rotating wheel and the label being approximately 3,000 m.

BRIEF DESCRIPTION OF THE DRAWING

These and other features of our present invention will now be described in detail, reference being made to the accompanying drawing in which.

SPECIFIC DESCRIPTION

Figure 2:
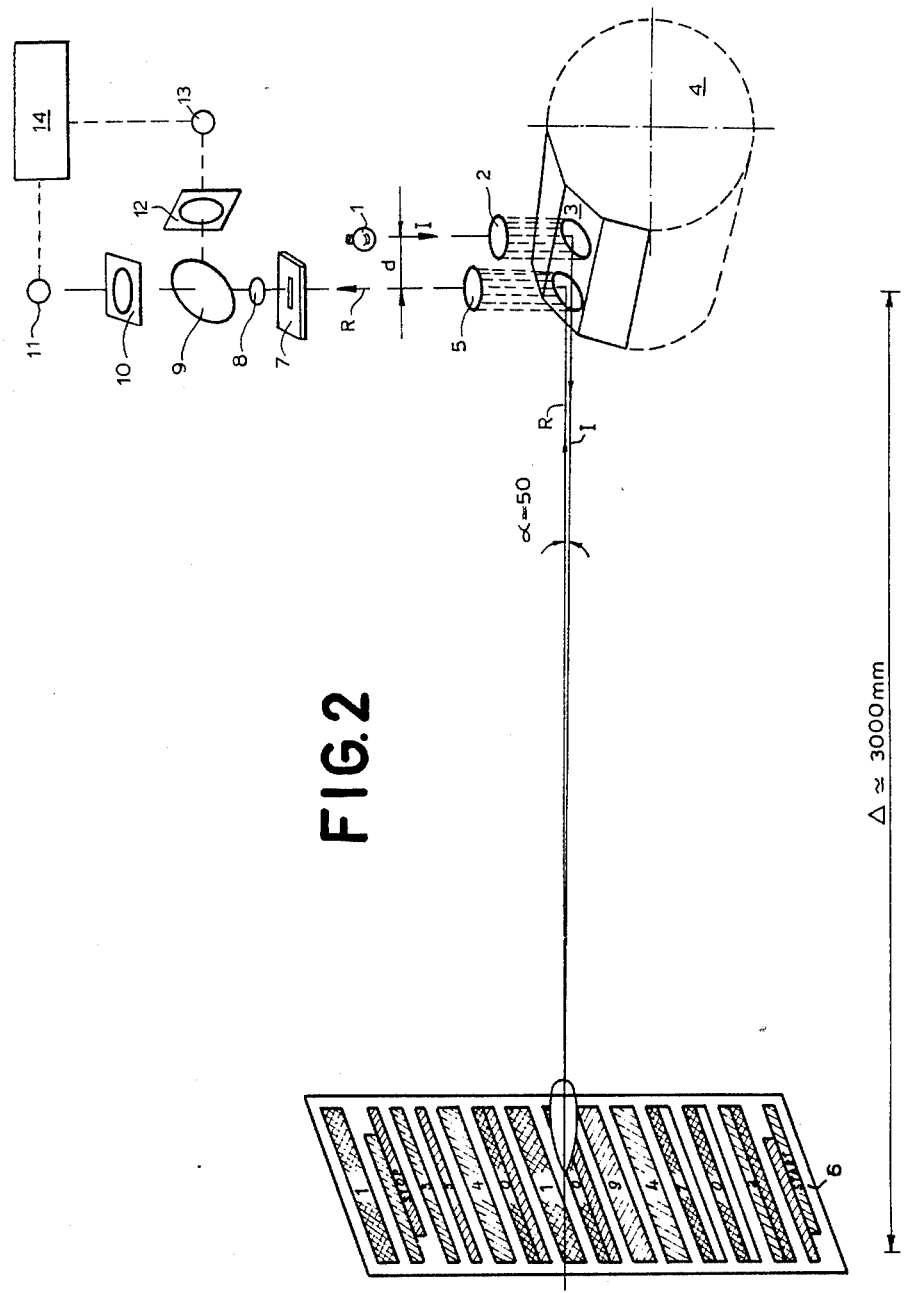
FIG. 2 is a schematic diagram of an optical-electronic system according to our present invention.

As illustrated in FIG. 2, a light source 1 sends a spot or shaft of parallel light beams through a lens 2 to half of an active or effective mirror 3 of a multifaceted wheel 4 rotated by a synchronous motor.

The light reflected by mirror 3 institutes a shaft of incident beams I which scan a space from bottom to top. A label 6 disposed in the space being scanned comprises red, blue, white and black stripes which being combined in pairs can encode any decimal figure or numeral, as indicated in FIG. 2.

The reflective label 6 can be placed at a distance of 2700–3300 from the rotating wheel 4 and at a height of approximately 1250 mm with reference to the level of the rotating wheel.

Figure 1:
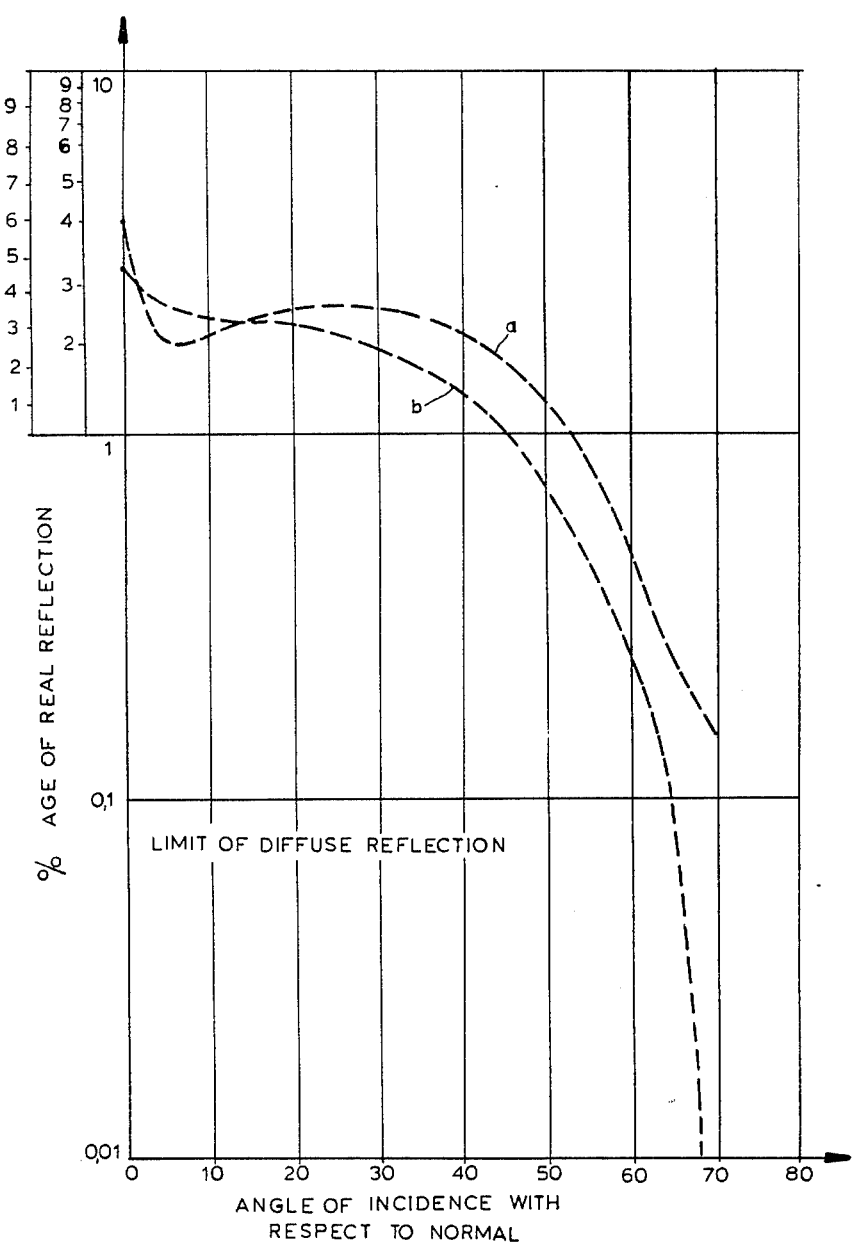
FIG. 1 is a graph showing a coefficient of retroflection as a function of the angle between an incident beam and a plane normal to a reflective surface.

FIG. 1 is a graph showing a coefficient of real or retroreflection (ordinate) varying with the angle between incident beam I and a plane normal to reflective label 6 (abscissa). The measurements have been performed by means of a device with a light-sensing cell placed in a projector. This made it possible for the reflection to be measured exactly in the direction in which the light was emitted. The 100% percentage is obtained when the reflective surface is a mirror.

A curve a in FIG. 1 has been plotted for a new reflective material (such as Scotchlite, a retroflective material produced by the Minnesota Mining and Manufacturing Company) and a curve b for the same reflective material after its having been used for one year on the wall or side of a railway car. Although the rate of changeable curves a and b is rather similar, it is to be noted that there is a definite difference between the curves in the vicinity of angle 0°. Thus, for a used reflective material, the reflection-coefficient variation about the 0° angle is reduced. The curves are plotted on semilogarithmic co-ordinates and they show the relatively low reflectivity of Scotchlite as compared to a mirror. The measurements were performed at the Research Railway Centre in Derby.

The firm producing "Scotchlite" materials has shown that the reflected light is mainly emitted within a very small divergence angle with respect to the incident light, namely of ±0.30°.

Taking into account the curves presented in FIG. 1, the conclusion to be reached is that, in case of used reflective materials, the divergence angle increases.

After the spot of beams I has reached the reflective surface, it is mainly reflected on the direction of the incident beam, as it is shown in the diagram in FIG. 3. The maximum intensity is recorded between ±0.3° as the producing firm and the diagram show it.

It is to be noted that, in the case of used reflective materials (graph a), the intensity variation with the angle is insignificant. In case of new reflective materials (graph a), it is possible to obtain an intensity abatement of about 5% for a deviation of 1° from the incidence axis.

As illustrated in FIG. 2, return beams R from label 6 are reflected by the effective mirror 3 and transmitted by a lens 5 to an optical processing system comprising a lens 8 and a diaphragm 7, which selects from the beam flux R an area corresponding to a width $\delta \approx 2-5$ mm on the reflective label 6.

Because the distance d between the axes of lenses 2 and 5 does not exceed 45 mm, and the distance $\Delta$ between label 6 and rotating wheel 4 is 3000 mm on an average, the angle $\alpha$ between the incident beam I and the reflected beam R is approximately 50'.

Curves a, b of FIG. 1 indicate that there are very small differences in the reflective light intensity for angles of reflection diverging by less than 1° from the theoretical reflection axis.

After the reflected beams R have been reflected by the mirror 3 of rotating wheel 4, the beam is taken over by the lens 5 and is processed by the optical system made up of the lens 8 and the diaphragm 7, which selects from the beam flux R an area corresponding to a width $\delta \approx 2-5$ mm on the reflective label.

The obtained light flux is applied to a dichroic mirror 9 which passes the red light and reflects blue light.

The two eight shafts from mirror 9 are filtered by a red-pass filter 10 and a blue pass filter 12 respectively, and transmitted to photomultipliers 11, 13 respectively.

The light signals are converted or transduced into electric signals by the photomultipliers and these signals are processed by an electronic block or unit 14 in order to be converted into a series of digits that make up the code of the reflective label 6.

In order to prevent reflections by a protection layer of label 6 from entering the system, and for a correct reading of color stripes in the highest and lowest positions on the label, the optical system can have an inclination of 12°-15° with reference to the rotating wheel, so that the incident beam I should form an angle of 12°-15° with a normal plane to the surface of the reflective label.

The optical-electronic system shown in FIG. 2 has the following advantages:

it eliminates any kind of shutter from the course or path of the beams sent by the light source towards the rotating wheel or the beams sent towards the optical system, increasing the energy efficiency of the system by about 82.5%;

it eliminates additional reflection caused by a use of the partially-silvered mirror, it facilitates the construction of the optical system, enabling the easy obtaining of the reflective label image;

it enables the obtaining of a better energy efficiency by the use of objectives with larger apertures, of bigger mirrors on the rotating wheel and of stronger light sources having a linear and not punctiform filament;

by increasing the energy efficiency, it permits the identification of worn labels and, on the whole, it permits the improvement of the percentage of identified labels;

it reduces to a great extent the background noise of the photomultipliers, by the complete separation of the beam emitted by the light source from the beam received from the reflective label.

We claim:

1. In an optoelectronic system for scanning a label affixed to an object such as a vehicle, said label having a plurality of color areas encoding information pertaining to said objects, said optoelectronic system comprising a rotatable wheel having a multiplicity of peripherally disposed outwardly facing planar mirrors on said wheel successively reflecting, during rotation of said wheel, a beam of light from a source toward said label and a return beam therefrom toward a transducer assembly for converting color light beams from said strips into electronic signals fed to a processor, the improvement comprising a first lens between said wheel and said source for transmitting a beam of light therefrom to a first surface area of an effective one of said mirrors to be reflected thereby along a first path toward said label, and a second lens between said wheel and said transducer assembly for transmitting thereto a return light beam reflected, upon incidence of the beam from said source on said label, along a second path separated from said first path to a second surface area of said effective mirror and reflected therefrom to said second lens, said first lens and said second lens being spaced from one another and having substantially parallel axes.

2. The improvement defined in claim 1 wherein said first path and said second path include an angle of approximately 50' with respect to one another.

3. The improvement defined in claim 2 wherein the distance between said label and said wheel is approximately 3000 mm.

4. The improvement defined in claim 1 wherein said source has a linear filament.

5. In an optoelectronic system for scanning a label affixed to an object such as a vehicle, said label having a plurality of color areas encoding information pertaining to said object, said optoelectronic system comprising a rotatable wheel having a multiplicity of peripherally disposed outwardly facing planar mirrors on said wheel successively reflecting, during rotation of said wheel, a beam of light from a source toward said label and a return beam therefrom toward a transducer assembly for converting color light beams from said strips into electronic signals fed to a processor, the improvement comprising a first lens between said wheel and said source for transmitting a beam of light therefrom to a first surface area of an effective one of said mirrors to be reflected thereby along a first path toward said label, and a second lens between said wheel and said transducer assembly for transmitting thereto a return light beam reflected, upon incidence of the beam from said source on said label, along a second path separated from said first path to a second surface area of said effective mirror and reflected therefrom to said second lens, said first lens and said second lens being spaced apart from one another and having substantially parallel axes, said effective mirror having a width one-and-one-half times the diameter of the larger of said first lens and said second lens.

6. The improvement defined in claim 5 wherein the distance between said label and said wheel is approximately 3,000 mm.

7. The improvement defined in claim 5 wherein said first path and said second path include an angle of approximately 50' between them.

8. The improvement defined in claim 5, claim 6 or claim 7 wherein said source has a linear filament.

* * * * *